(12) United States Patent
Okada (10) Patent No.: US 9,285,245 B2
(45) Date of Patent: Mar. 15, 2016

(54) ABSOLUTE ENCODER

(71) Applicant: CANON KABUSHIKI KAISHA, Tokyo (JP)

(72) Inventor: Yoshiyuki Okada, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 182 days.

(21) Appl. No.: 14/103,920

(22) Filed: Dec. 12, 2013

(65) Prior Publication Data

US 2014/0166865 A1    Jun. 19, 2014

(30) Foreign Application Priority Data

Dec. 14, 2012  (JP) ................................. 2012-274051

(51) Int. Cl.
| | | |
|---|---|---|
| *G01D 5/34* | (2006.01) | |
| *G01D 5/347* | (2006.01) | |
| *G01D 5/244* | (2006.01) | |

(52) U.S. Cl.
CPC .......... *G01D 5/34776* (2013.01); *G01D 5/2448* (2013.01); *G01D 5/34792* (2013.01)

(58) Field of Classification Search
CPC  G01D 5/347; G01D 5/34707; G01D 5/34776

USPC ............. 250/231.13, 231.14, 231.16, 231.18; 33/707; 341/13; 702/150, 151

See application file for complete search history.

(56) References Cited

U.S. PATENT DOCUMENTS

2014/0367561 A1*  12/2014  Ito et al. ..................... 250/231.1

FOREIGN PATENT DOCUMENTS

| JP | 09-127141 A | 5/1997 |
|---|---|---|
| JP | 2001-311630 A | 11/2001 |
| JP | 2012-037392 A | 2/2012 |

* cited by examiner

*Primary Examiner* — Kevin Pyo
(74) *Attorney, Agent, or Firm* — Rossi, Kimms & McDowell LLP (57) ABSTRACT

The present invention provides an absolute encoder including a scale on which a first mark and a second mark are arrayed, a detector configured to detect light from the scale, and to output periodic signals in which peak values, including a first peak value corresponding to the first mark and a second peak value corresponding to the second mark and smaller than the first peak value periodically appear, and a processor configured to obtain a code sequence by binarization of the first peak value and the second peak value in the periodic signals output from the detector, wherein the processor has a function of performing calibration so that the first peak value becomes larger than a threshold for the binarization and the second peak value becomes smaller than the threshold.

12 Claims, 11 Drawing Sheets

ABSOLUTE ENCODER

BACKGROUND OF THE INVENTION

1. Field of the Invention

The present invention relates to an absolute encoder.

2. Description of the Related Art

An encoder for measuring a position or angle is used for an industrial apparatus (processing apparatus) or measurement apparatus. For example, an optical encoder irradiates a scale with light from a light source, and detects transmitted, light or reflected light from the scale by photoelectric conversion devices. The light source and photoelectric conversion devices are attached to a moving or rotating measurement target object, and the scale is attached to a reference structure. Alternatively, the scale may be attached to the measurement target object, and the light source and the photoelectric conversion devices may be attached to the structure.

In general, encoders are roughly classified into incremental encoders and absolute encoders. The incremental encoders include incremental linear encoders for measuring a relative position and incremental rotary encoders for measuring a relative angle. The absolute encoders include absolute linear encoders for measuring an absolute position and absolute rotary encoders for measuring an absolute angle.

In an incremental encoder, transmission films or reflection films are formed on a scale at equal intervals, and light intensity signals output from photoelectric conversion devices are sinusoidal signals of a given period. A signal processing unit counts the number of waves of the sinusoidal signals, and divides a phase within one period into a number of sections, thereby improving the measurement resolution and accuracy. On the other hand, in an absolute encoder, a pseudo random number code is formed on a scale by transmission films or reflection films, and light intensity signals corresponding to the pseudo random number code are output from photoelectric conversion devices. A signal processing unit refers to a table representing the correspondence between a pseudo random number code and an absolute position or absolute angle, and calculates an absolute position or absolute angle corresponding to the light intensity signals output from the photoelectric conversion devices. In this case, similarly to the incremental encoder, it is possible to improve the measurement resolution and accuracy by dividing the phase of the pseudo random number code included in the light intensity signals into a number of sections.

As described above, an encoder includes a light source, a scale, photoelectric conversion devices, and a signal processing unit. However, light intensities (light intensity signals) output from the photoelectric conversion devices do not have a predetermined value for various reasons. For example, the light intensity of light emitted by the light source tends to change depending on a driving current value or temperature, and to lower with time. Variations occur in transmission films or reflection films formed on the scale in a manufacturing process, resulting in variations in transmittance or reflectance of the scale. Furthermore, since variations occur in transmittance or reflectance between scales, light intensities do not have a predetermined value. The light intensities also change depending on attachment of the scale or the light source and photoelectric conversion devices, and thus do not have the predetermined value.

To solve this problem, Japanese Patent Laid-Open Nos. 2001-311630 and 9-127141 respectively propose techniques of stabilizing light intensity signals output from the photoelectric conversion devices of an incremental encoder. Japanese Patent Laid-Open No. 2001-311630 discloses a technique of calculating the square root of the square sum of two light intensity signals having a phase difference of 90°, that is, an A- and B-phase signals, and controlling a light source so that the calculated value is constant. Japanese Patent Laid-Open No. 9-127141 discloses a technique of controlling the amplitude of the light intensity signals to be a predetermined value by extracting positive and negative peak values of the A- and B-phase signals, and adjusting the gain of the light intensity signals based on the result of comparing each peak value with a reference value.

On the other hand, Japanese Patent Laid-Open No. 2012-37392 proposes an absolute encoder in which a scale representing a pseudo random number sequence such as an M-sequence code has three transmittances or reflectances of 0%, 50%, and 100% rather than two values of 0% and 100%. This encoder sets a threshold between 50% and 100%, binarizes each light intensity signal into 0 or 1, and decodes the thus obtained code sequence (code), thereby measuring an absolute position or absolute angle. In this case, since the light intensity signals conform to a pseudo random number sequence, it is impossible to obtain sinusoidal signals having a constant amplitude, unlike a general incremental encoder. In other words, since regions having transmittances or reflectances of 50% and 100% are formed on the scale as pseudo random numbers, peak values at 50% and 100% randomly appear in obtained light intensity signals.

An encoder used for an industrial apparatus or measurement apparatus needs to measure a position or angle with high accuracy by stabilizing light intensity signals irrespective of a change in environment (temperature), a change with time, attachment of a scale or a light source and photoelectric conversion devices, manufacturing variations in scales, and the like.

As described above, however, unlike Japanese Patent Laid-Open Nos. 2001-311630 and 9-127141, in Japanese Patent Laid-Open No. 2012-37392, light intensity signals output from the photoelectric conversion devices are not sinusoidal signals with a constant amplitude but signals in which two amplitudes randomly appear. It is impossible to apply the techniques disclosed in Japanese Patent Laid-Open Nos. 2001-311630 and 9-127141 to adjust the light intensity signals to a predetermined value irrespective of a change in environment, a change with time, attachment, manufacturing variations, and the like.

SUMMARY OF THE INVENTION

The present invention provides, for example, an absolute encoder advantageous in terms of measurement accuracy.

According to one aspect of the present invention, there is provided an absolute encoder including a scale on which a first mark and a second mark are arrayed, a detector configured to detect light from the scale, and to output periodic signals in which peak values, including a first peak value corresponding to the first mark and a second peak value corresponding to the second mark and smaller than the first peak value, periodically appear, and a processor configured to obtain a code sequence by binarization of the first peak value and the second peak value in the periodic signals output from the detector, wherein the processor has a function of performing calibration so that the first peak value becomes larger than a threshold for the binarization and the second peak value becomes smaller than the threshold.

Further features of the present invention will become apparent from the following description of exemplary embodiments with reference to the attached drawings.

DESCRIPTION OF THE EMBODIMENTS

Preferred embodiments of the present invention will be described below with reference to the accompanying drawings. Note that the same reference numerals denote the same members throughout the drawings, and a repetitive description thereof will not be given.

First Embodiment

Figure 1:
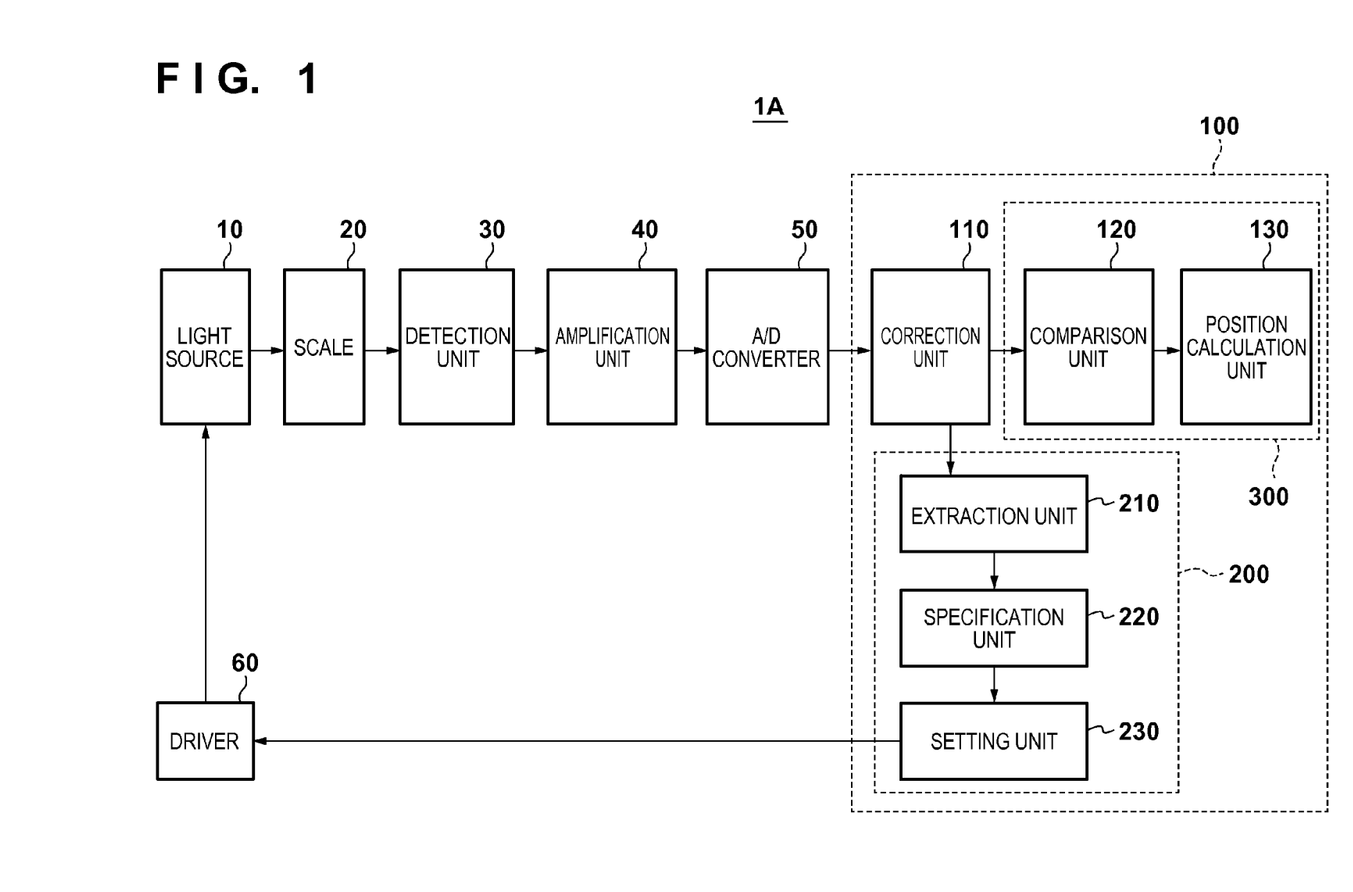
FIG. 1 is a schematic block diagram showing the arrangement of an absolute encoder according to the first embodiment of the present invention.

FIG. 1 is a schematic block diagram showing the arrangement of an absolute encoder 1A according to the first embodiment of the present invention. For example, the absolute encoder 1A is used for an industrial apparatus (processing apparatus) or measurement apparatus. Although the absolute encoder 1A is a linear encoder for measuring a position (absolute position) in this embodiment, it may be a rotary encoder for measuring an angle (absolute angle).

As shown in FIG. 1, the absolute encoder 1A includes a light, source 10, a scale 20, a detection unit 30, an amplification unit 40, an A/D converter 50, and a processing unit 100.

The light source 10 includes an LED, and is driven by a driver 60 to emit light which enters the scale 20. On the scale 20, a pseudo random number code such as an M-sequence cyclic code is formed by transmission films or reflection films. Therefore, the intensity of light having been transmitted through the scale 20 corresponds to the pseudo random number code. The detection unit 30 is formed by photoelectric conversion devices such as a CMOS image sensor or CCD sensor, and detects light from the scale 20.

Signals (light intensity signals) output from the detection unit 30 are converted into voltage signals by a current/voltage conversion amplifier (not shown). The amplification unit 40 amplifies the converted voltage signals, as needed. The A/D converter 50 converts the analog signals output from the amplification unit 40 into digital signals. Based on the digital signals output from the A/D converter 50 (that is, the signals output from the detection unit 30), the processing unit 100 performs signal processing for obtaining the absolute position of the scale 20.

The processing unit 100 is formed by a high-speed digital signal processor such as an FPGA (Field Programmable Gate Array) or DSP (Digital Signal Processor). The processing unit 100 includes a correction unit 110, a calibration unit 200, and a calculation unit 300 for calculating the absolute position of the scale 20. In this embodiment, the calibration unit 200 includes an extraction unit 210, a specification unit 220, and a setting unit 230. The calculation unit 300 includes a comparison unit 120 and a position calculation unit 130.

The correction unit 110 performs offset correction and gain correction for the signals output from the A/D converter 50, as needed. The comparison unit 120 compares each signal output from the correction unit 110 with a threshold, and converts the signal into a binary signal (a signal of 0 or 1) indicating whether the signal is larger or smaller than the threshold. The position calculation unit 130 calculates the absolute position of the scale 20 based on the binary signals from the comparison unit 120.

Figure 2:
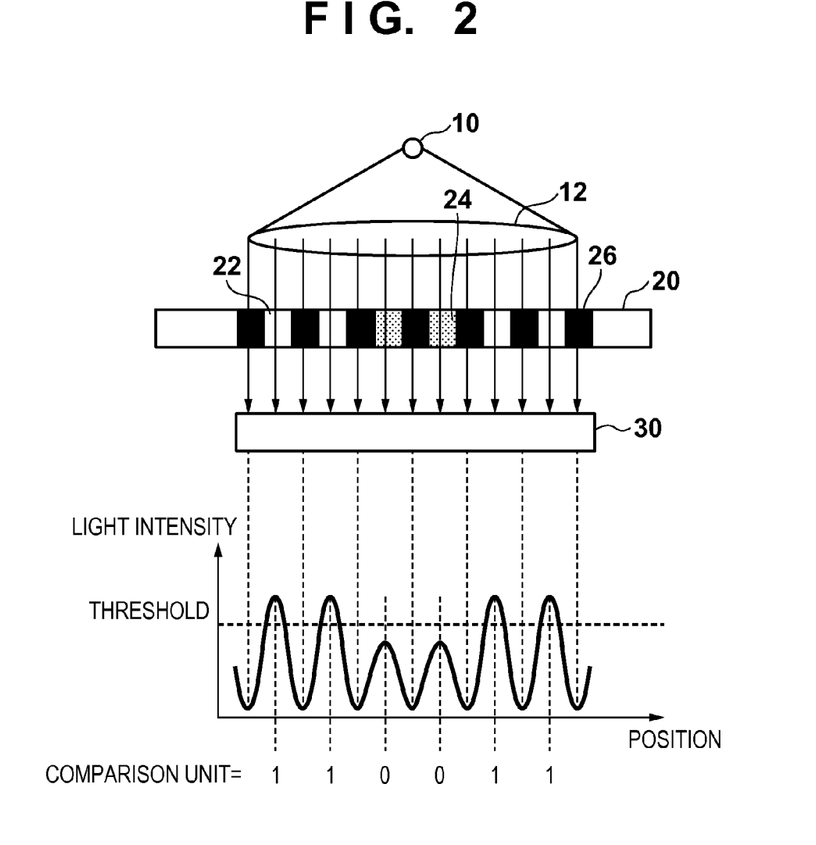
FIG. 2 is a view showing an example of the arrangement of the absolute encoder shown in FIG. 1 from a light source to a detection unit, and an example of light intensity signals output from the detection unit.

An example of the arrangement of the absolute encoder 1A from the light source 10 to the detection unit 30 and an example of light intensity signals output from the detection unit 30 will be described with reference to FIG. 2.

Light emitted by the light source 10 is converted into parallel light through a collimator lens 12, and enters the scale 20. In this embodiment, first marks 22, second marks 24, and third marks 26 which have different transmittances (that is, three transmittances) are formed (arrayed) on the scale 20. For example, the first mark 22 has a transmittance of 100%, the second mark 24 has a transmittance of 50%, and the third mark 26 has a transmittance of 0%. In this case, the light intensity signals output from the detection unit 30 include first peak values corresponding to the first marks 22 (light beams having been transmitted through the first marks 22), second peak values corresponding to the second marks 24 (light beams having been transmitted through the second marks 24), and minimum values corresponding to the third marks 26. These light intensity signals are periodic signals in which peak values including the first peak value and second peak value periodically appear, as shown in FIG. 2.

The comparison unit 120 compares each light intensity signal (the first peak or second peak) output from the detection unit 30 with the threshold, and converts it into a binary signal which has a value of 1 if the signal is larger than the threshold or a value of 0 if the corresponding signal is smaller than the threshold. In other words, a code sequence is obtained by binarizing the first peak values and second peak values of the light intensity signals output from the detection unit 30. The binary signals indicate a pseudo random number code corresponding to the position of the scale 20, and the position calculation unit 130 calculates the absolute position of the scale 20 by referring to the table representing the correspondence between the pseudo random number code and the absolute position. The period of the peak values or minimum values of the light intensity signals is constant, and is generally several μm to several hundred μm. As the period of the peak values or minimum values of the light intensity signals is shorter, the resolution of the absolute position increases. As the period of the peak values or minimum values of the light intensity signals is longer, the resolution of the absolute position decreases.

If, for example, the period of the peak values or minimum values of the light intensity signals is 100 μm and the pseudo random number code includes 16 bits, the resolution of the absolute position is 100 μm and the maximum possible measurement, range is 6.5536 m corresponding to 16 bits times 100 μm. If the period of the peak values or minimum values of the light intensity signals is 100 μm and the pseudo random number code includes 12 bits, the resolution of the absolute position is 100 μm and the maximum possible measurement range is 0.4096 m.

The detection unit 30 is configured so that a plurality of photoelectric conversion devices are arranged within one period of the peak values or minimum values of the light intensity signals. If, for example, the detection unit 30 is configured so that 10 photoelectric conversion devices are arranged within one period and the pseudo random number code includes 16 bits, the number of photoelectric conversion devices forming the detection unit 30 is 160.

Japanese Patent Laid-Open No. 2012-37392 discloses details of the absolute encoder 1A using the scale 20 having three transmittances (or reflectances). Since light from the scale 20 has three light intensities, the absolute encoder 1A can measure the absolute position as an absolute encoder, and achieve a measurement resolution and accuracy as high as those of an incremental encoder by phase division. As described above, the absolute encoder 1A does not have two scales including an absolute scale which has two transmittances corresponding to a pseudo random number code and an incremental scale which has two transmittances and repeatedly, periodically changes the intensity. Note that the absolute encoder 1A includes the scale 20 having three transmittances and, therefore, even one scale can form an absolute encoder having a high measurement resolution and high accuracy.

In the absolute encoder 1A, the light intensity signals corresponding to the pseudo random number code by the scale 20 having three transmittances are not sinusoidal signals having a constant amplitude, unlike a general incremental encoder. On the scale 20, the first marks 22 having a transmittance of 100% and the second marks 24 having a transmittance of 50% are formed as random numbers. Therefore, the detection unit 30 randomly detects the first peak values corresponding to the first marks 22 and the second peak values corresponding to the second marks 24.

On the other hand, as described above, the encoder used for an industrial apparatus or measurement apparatus needs to measure a position or angle with high accuracy irrespective of a change in environment (temperature), a change with time, attachment of the scale or the light source and detection unit (photoelectric conversion devices), manufacturing variations in scales, and the like. The encoder, therefore, needs to stabilize the light intensity signals which are output from the detection unit and processed by the processing unit, irrespective of a change in environment, a change with time, attachment of the scale or the light source and detection unit, manufacturing variations in scales, and the like.

Figure 3A:
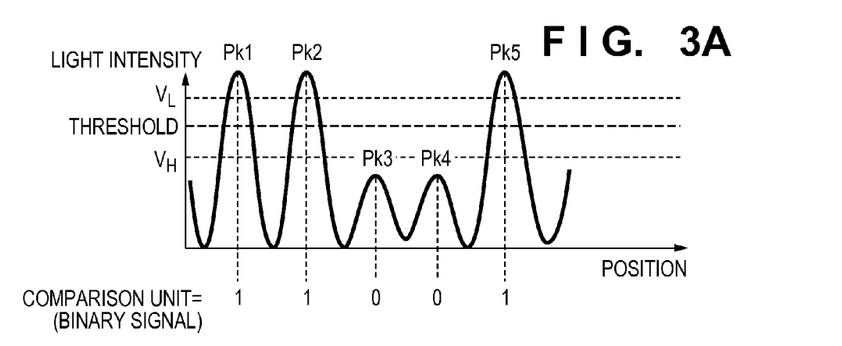
FIGS. 3A to 3C are graphs respectively showing a case in which light intensity signals output from the detection unit of the absolute encoder shown in FIG. 1 are normal and cases in which the light intensity signals are abnormal.
Figure 3B:
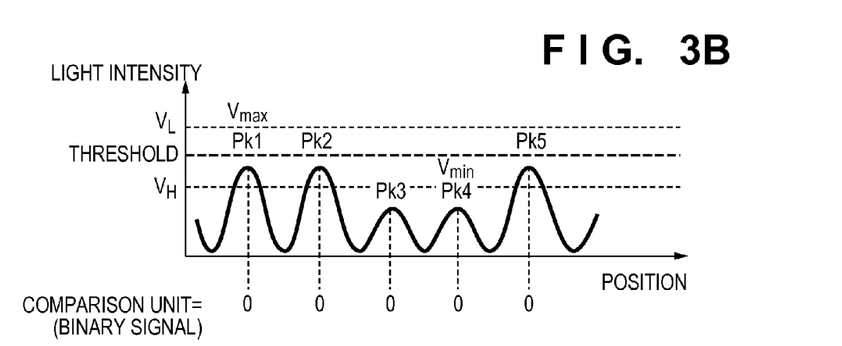
Figure 3C:
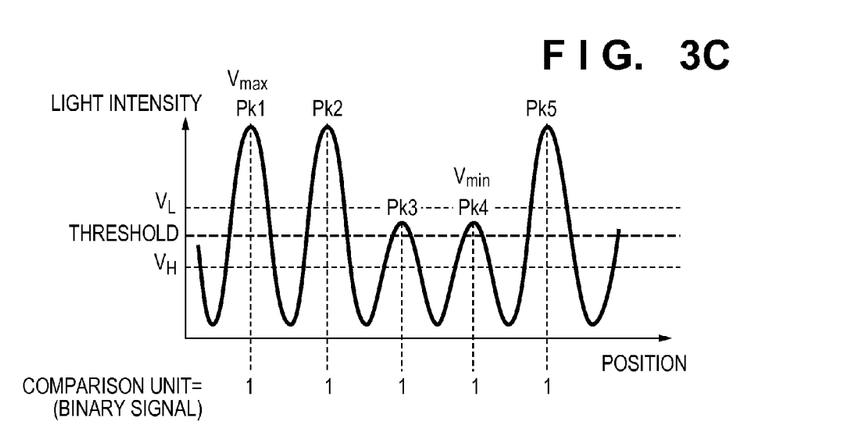

FIGS. 3A to 3C respectively show a case in which the light intensity signals output from the detection unit 30 are normal and cases in which the light intensity signals output from the detection unit 30 are abnormal (the light intensity signals are influenced by a change in environment, a change with time, attachment of the scale or the light source and detection unit, manufacturing variations in scales, and the like).

FIG. 3A shows a case in which the light intensity signals output from the detection unit 30 are normal. In this case, the comparison unit 120 compares the light intensity signals (the first peak values and second peak values included in the light intensity signals) with the threshold, and converts them into normal binary signals. More specifically, as shown in FIG. 3A, a first peak value Pk1 and a second peak value Pk2 (the first peak values) included in the light intensity signals are larger than the threshold, and thus binary signals "1" and "1" are output from the comparison unit 120. On the other hand, since a third peak value Pk3 and a fourth peak value Pk4 (the second peak values) included in the light intensity signals are smaller than the threshold, binary signals "0" and "0" are output from the comparison unit 120. Since a fifth peak value Pk5 (the first peak value) included in the light intensity signals is larger than the threshold, a binary signal output from the comparison unit 120 is "1". As a result, the binary signals "1, 1, 0, 0, 1" are output from the comparison unit 120.

FIG. 3B shows a case in which the light intensity signals output from the detection unit 30 are small. In this case, if the comparison unit 120 respectively compares the light intensity signals with the threshold, all the peak values Pk1 to Pk5 included in the light intensity signals are smaller than the threshold, and thus binary signals "0, 0, 0, 0, 0" are output from the comparison unit 120. If such erroneous binary signals are output from the comparison unit 120, the position calculation unit 130 unwantedly calculates an erroneous absolute position.

FIG. 3C shows a case in which the light intensity signals output from the detection unit 30 are large. In this case, if the comparison unit 120 respectively compares the light intensity signals with the threshold, all the peak values Pk1 to Pk5 included in the light intensity signals exceed the threshold, and thus binary signals "1, 1, 1, 1, 1" are output from the comparison unit 120. If such erroneous binary signals are output from the comparison unit 120, the position calculation unit 130 unwantedly calculates an erroneous absolute position.

To solve the above problem, the absolute encoder 1A includes the calibration unit 200 to correctly perform the above-described absolute position calculation processing (calculation processing by the calculation unit 300). The calibration unit 200 calibrates the relationship between the threshold and the light intensity signals output from the detection unit 30 so that the first peak values included in the light intensity signals become larger than the threshold and the second peak values become smaller than the threshold. In other words, the calibration unit 200 has a function of performing calibration so that the first peak values included in the light intensity signals become larger than the threshold for binarization and the second peak values smaller than the first peak values become smaller than the threshold for binarization.

Calibration by the calibration unit 200 will be described in detail with reference to FIGS. 1, 3A to 3C, and 4. As described above, the first marks 22 having a transmittance of 100% and the second marks 24 having a transmittance of 50% are formed on the scale 20 as random numbers. Therefore, the detection unit 30 randomly detects the first peak values (maximum peak values) corresponding to the first marks 22 and the second peak values (intermediate peak values) corresponding to the second marks 24. The interval between a given minimum value and a next minimum value included in the light intensity signals or the interval between a given peak value and a next peak value depends on the interval between the marks formed on the scale 20, and their period is constant. In this embodiment, the period is set to one period of the light intensity signals.

Figure 4:
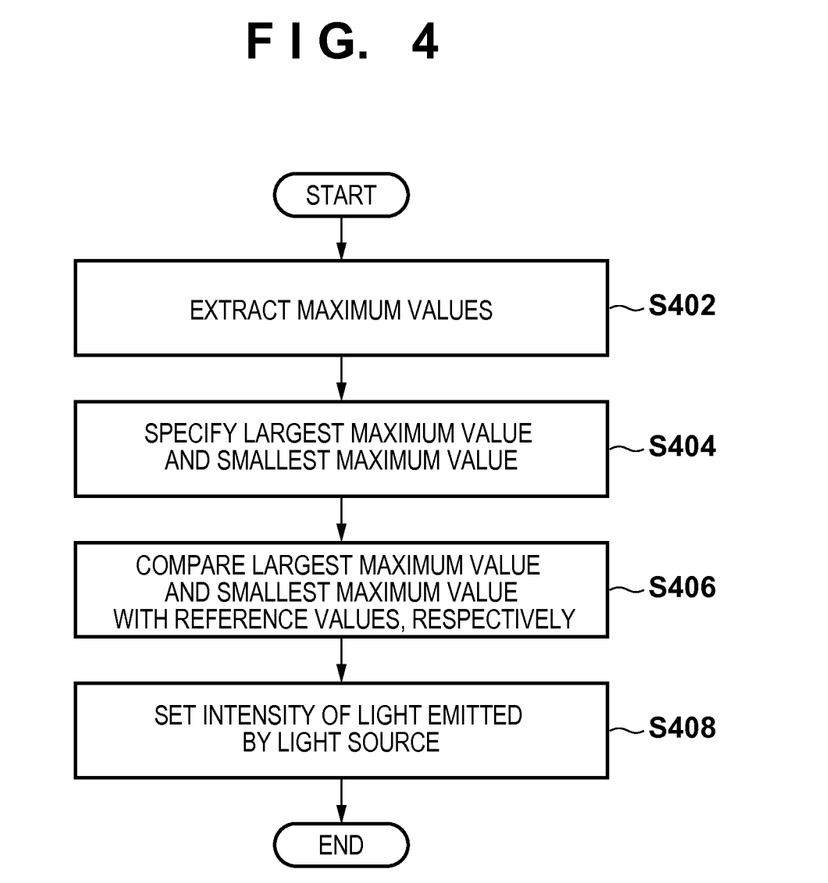
FIG. 4 is a flowchart for explaining calibration by the calibration unit of the absolute encoder shown in FIG. 1.

As shown in FIG. 4, in step S402, the extraction unit 210 extracts a maximum value (peak value) for each period of the light intensity signals from the detection unit 30 (in this embodiments, the signals having undergone offset correction and gain correction from the correction unit 110). For example, the extraction unit 210 extracts a maximum value for each period, that is, each of the peak values Pk1 to Pk5 during the interval from a given minimum value to a next minimum value with respect to the light intensity signals shown in FIGS. 3A to 3C.

In step S404, the specification unit 220 specifies a largest maximum value (first maximum value) $V_{max}$ and a smallest maximum value (second maximum value) $V_{min}$ among the maximum values extracted in step S402. For example, in FIGS. 3B and 3C, among the peak values Pk1 to Pk5, the specification unit 220 specifies the peak value Pk1 as the largest maximum value $V_{max}$ and the peak value Pk4 as the smallest maximum value $V_{min}$.

In step S406, the setting unit 230 compares the largest maximum value $V_{max}$ specified in step S404 with a predetermined reference value (first reference value) $V_L$, and compares the smallest maximum value $V_{min}$ specified in step S404 with a predetermined reference value (second reference value) $V_H$. The reference value $V_L$ is larger than the threshold and the reference value $V_H$ is smaller than the threshold. In step S406, the setting unit 230 may respectively compare the largest maximum value $V_{max}$ and the smallest maximum value $V_{min}$ specified in step S404 with the threshold.

In step S408, based on a comparison result in step S406, the setting unit 230 sets the intensity of light emitted by the light source 10 so that the maximum value $V_{max}$ becomes equal to or larger than the reference value $V_L$ (first reference value) and the maximum value $V_{min}$ becomes equal to or smaller than the reference value $V_H$ (second reference value).

In FIG. 3B, for example, the setting unit 230 determines a lower limit value $I_L$ of a current value for driving the light source 10 so that the largest maximum value $V_{max}$ becomes equal to or larger than the reference value $V_L$ as a lower limit value. The setting unit 230 also determines an upper limit value $I_H$ of the current value for driving the light source 10 so that the smallest maximum value $V_{min}$ becomes equal to or smaller than the reference value $V_H$ as an upper limit value. Note that the relationship between the light intensity and the current value for driving the light source 10 may be measured and obtained in advance, or design values may be used as the current value and light intensity. Note also that the lower and upper limit values may be determined based on not the reference values $V_L$ and $V_H$ but a ratio with respect to the threshold, thereby determining the lower limit value $I_L$ and the upper limit value $I_H$ of the current value. The setting unit 230 sets the driving current value of the light source 10 in the driver 60 to fall within the range from the determined lower limit value $I_L$ (inclusive) to the determined upper limit value $I_H$ (inclusive). For example, the driving current value of the light source 10 may be set to the average value of the lower limit value $I_L$ and the upper limit value $I_H$.

By setting the driving current value of the light source 10 as described above, the largest maximum value $V_{max}$ included in the light intensity signals becomes equal to or larger than the reference value $V_L$ as a lower limit value, and the smallest maximum value $V_{min}$ included in the light intensity signals becomes equal to or smaller than the reference value $V_H$ as an upper limit value. As shown in FIG. 3A, therefore, the peak values Pk1 to Pk5 included in the light intensity signals are correctly converted into binary values with reference to the threshold, and binary signals "1, 1, 0, 0, 1" are output from the comparison unit 120.

With this operation, the absolute encoder 1A can stabilize the light intensity signals which are output from the detection unit 30 and processed by the processing unit 100, irrespective of a change in environment, a change with time, attachment of the scale 20 or the light source 10 and detection unit 30, manufacturing variations in scales 20, and the like. The absolute encoder 1A can thus measure the absolute position of the scale 20 with high accuracy.

In this embodiment, the marks formed on the scale 20 have three transmittances (or reflectances) of 0%, 50%, and 100%. The present invention, however, is not limited to them, and arbitrary three values may be used. If, for example, it is difficult to form marks having transmittances of 0% and 100% on the scale 20, marks having transmittances of 10%, 40%, and 90% or 20%, 40%, and 80% may be formed on the scale 20. In this case, a largest maximum value $V_{max}$ and a smallest maximum value $V_{min}$ included in light intensity signals are specified, lower and upper limit values are determined according to the ratio of the three values, and the driving current value of the light source 10 is set to satisfy the condition. This makes it possible to correctly convert peak values Pk1 to Pk5 included in the light intensity signals into binary values (that is, to output correct binary signals from the comparison unit 120), and measure the absolute position of the scale 20 with high accuracy. If, for example, marks formed on the scale 20 have transmittances of 20%, 40%, and 80%, the maximum peak value indicates a light intensity corresponding to a transmittance in the neighborhood of 80% and the intermediate peak value indicates a light intensity corresponding to a transmittance in the neighborhood of 40%. In this case, the threshold is set to 60%, the lower limit value is set to 65%, and the upper limit value is set to 55%. Setting the driving current value of the light source 10 to satisfy the above condition allows stabilization of the light intensity signals and measurement of the absolute position of the scale 20 with high accuracy.

As described above, the absolute encoder 1A can measure the position of the scale 20 with high accuracy even if the light intensity signals are not sinusoidal signals having a constant amplitude but random signals having three values.

Second Embodiment

Figure 5:
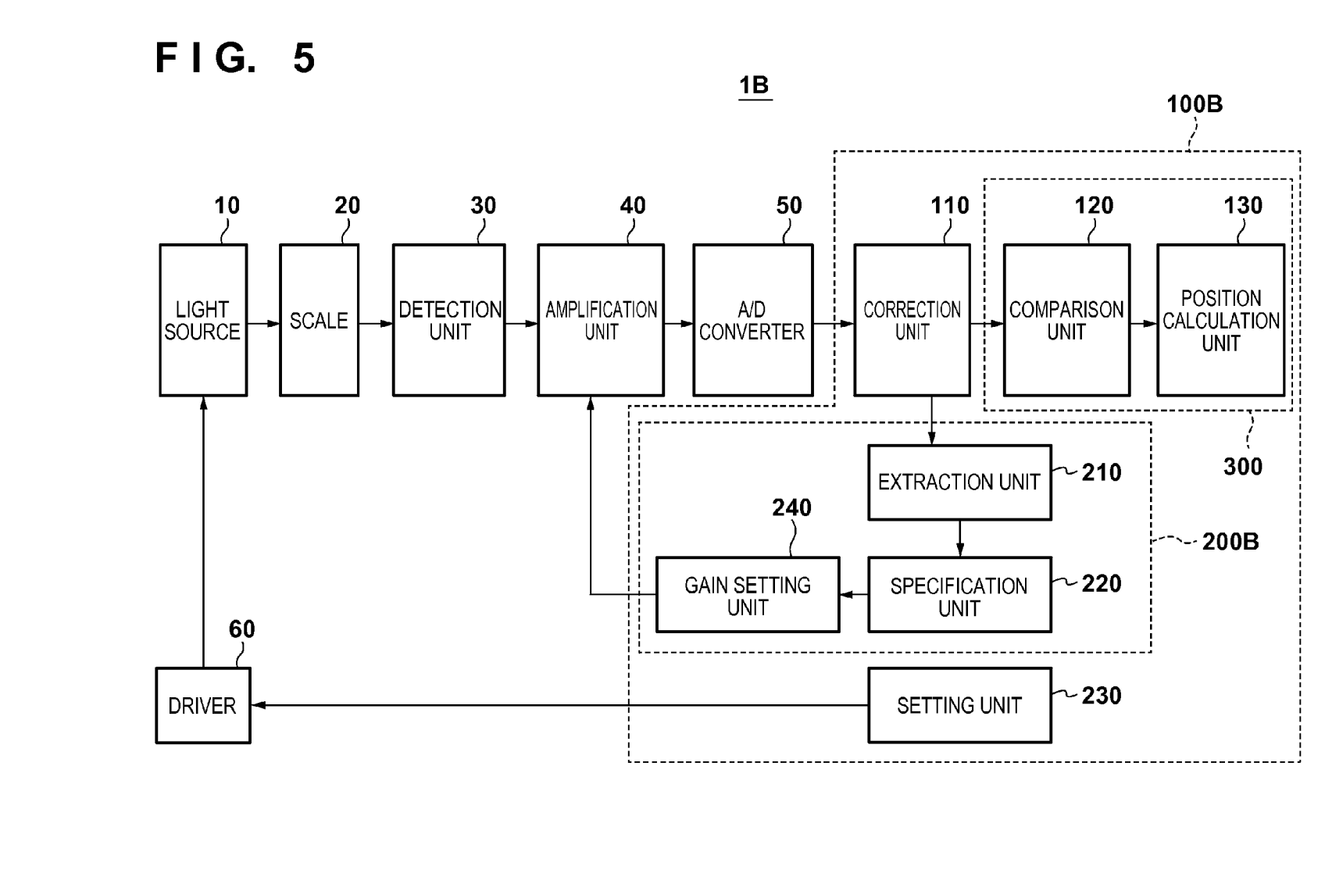
FIG. 5 is a schematic block diagram showing the arrangement of an absolute encoder according to the second embodiment of the present invention.

FIG. 5 is a schematic block diagram showing the arrangement of an absolute encoder 1B according to the second embodiment of the present invention. A processing unit 100B, more specifically, a calibration unit 200B of the absolute encoder 1B is different from that of the absolute encoder 1A. In this embodiment, the calibration unit 200B includes an extraction unit 210, a specification unit 220, and a gain setting unit 240.

Calibration by the calibration unit 200B will be described in detail with reference to FIGS. 3A, 3B, and 5. As in the first embodiment, the extraction unit 210 extracts a maximum value for each period of light intensity signals. The specification unit 220 specifies a largest maximum value $V_{max}$ and a smallest maximum value $V_{min}$ among the maximum values extracted by the extraction unit 210.

The gain setting unit 240 compares the largest maximum value $V_{max}$ specified by the specification unit 220 with a predetermined reference value $V_L$, and compares the smallest maximum value $V_{min}$ specified by the specification unit 220 with a predetermined reference value $V_H$. Based on a comparison result, the gain setting unit 240 sets the amplitude ratio (gain) of a signal in an amplification unit 40 to fall within the range from a value (inclusive) obtained by dividing the reference value $V_L$ by the maximum value $V_{max}$ to a value (inclusive) obtained by dividing the reference value $V_H$ by the maximum value $V_{min}$.

For example, in FIG. 3B, the gain setting unit 240 calculates, based on the largest maximum value $V_{max}$, a lower limit gain $G_L=V_L/V_{max}$ whose lower limit value is set to the reference value $V_L$ and calculates, based on the smallest maximum value $V_{min}$, an upper limit gain $G_H=V_H/V_{min}$ whose upper limit value is set to the reference value $V_H$. The gain setting unit 240 then sets the gain in the amplification unit 40 to fall within the range from the lower limit gain $G_L$ (inclusive) to the upper limit gain $G_H$ (inclusive). For example, the gain in the amplification unit 40 may be set to the average value of the lower limit gain $G_L$ and the upper limit gain $G_H$.

By setting the gain in the amplification unit 40 as described above, the largest maximum value $V_{max}$ included in the light intensity signals becomes equal to or larger than the reference value $V_L$ as a lower limit value, and the smallest maximum value $V_{min}$ included in the light intensity signals becomes equal to or smaller than the reference value $V_H$ as an upper limit value. As shown in FIG. 3A, therefore, peak values Pk1 to Pk5 included in the light intensity signals are correctly converted into binary values with reference to the threshold, and binary signals "1, 1, 0, 0, 1" are output from a comparison unit 120.

The absolute encoder 1B can stabilize the light intensity signals which are output from a detection unit 30 and processed by the processing unit 100B, irrespective of a change in environment, a change with time, attachment of a scale 20 or a light source 10 and the detection unit 30, manufacturing variations in scales 20, and the like. The absolute encoder 1B can thus measure the absolute position of the scale 20 with high accuracy.

Third Embodiment

Figure 6:
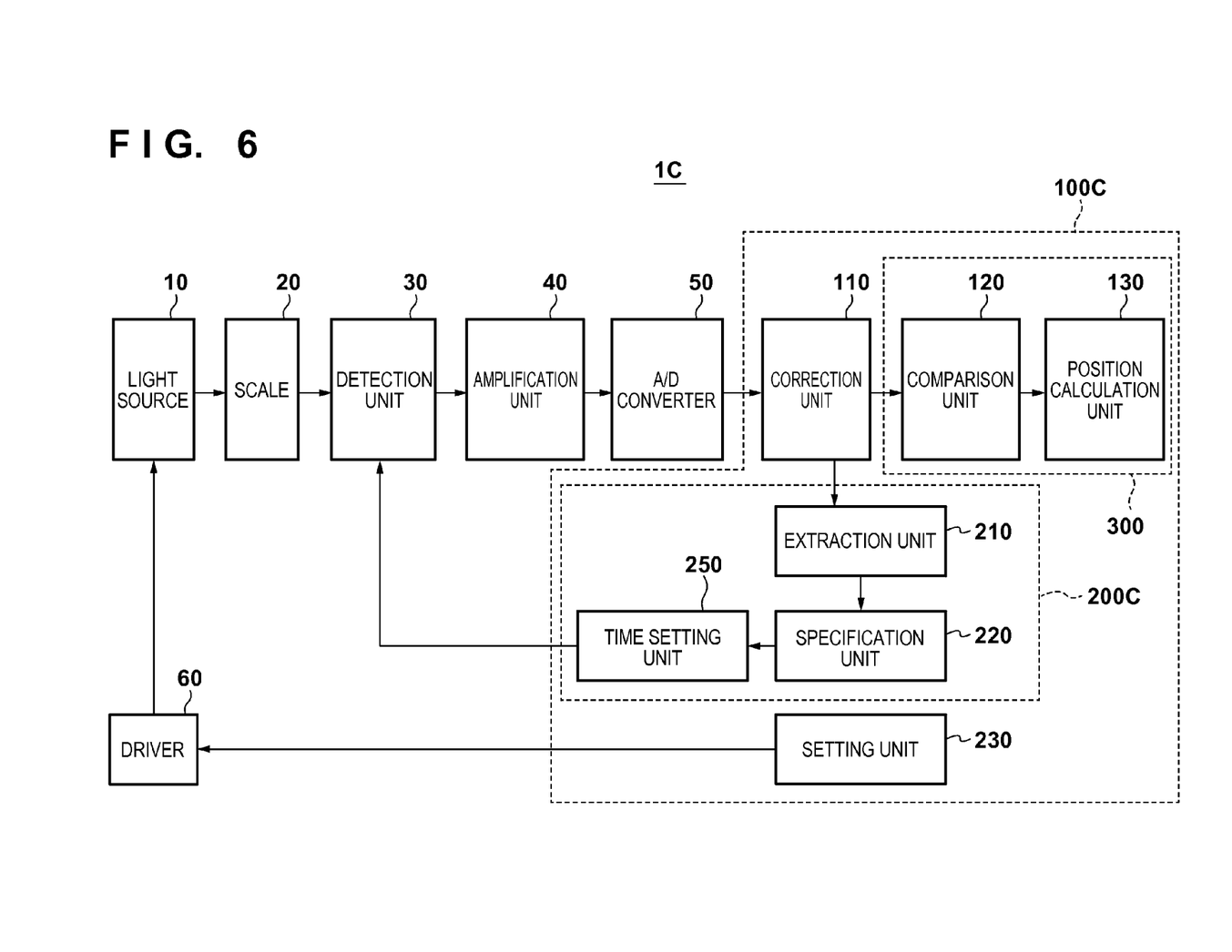
FIG. 6 is a schematic block diagram showing the arrangement of an absolute encoder according to the third embodiment of the present invention.

FIG. 6 is a schematic block diagram showing the arrangement of an absolute encoder 1C according to the third embodiment of the present invention. A processing unit 100C, more specifically, a calibration unit 200C of the absolute encoder 1C is different from that of the absolute encoder 1A. In this embodiment, the calibration unit 200C includes an extraction unit 210, a specification unit 220, and a time setting unit 250.

Calibration by the calibration unit 200C will be described in detail with reference to FIGS. 3A, 3B, and 6. As in the first embodiment, the extraction unit 210 extracts a maximum value for each period of light intensity signals. The specification unit 220 specifies a largest maximum value $V_{max}$ and a smallest maximum value $V_{min}$ among the maximum values extracted by the extraction unit 210.

The time setting unit 250 compares the largest maximum value $V_{max}$ specified by the specification unit 220 with a predetermined reference value $V_L$, and compares the smallest maximum value $V_{min}$ specified by the specification unit 220 with a predetermined reference value $V_H$. Based on a comparison result, the time setting unit 250 sets the accumulation time of photoelectric conversion devices forming a detection unit 30 to fall within the range from a value (inclusive) obtained by dividing the reference value $V_L$ by the maximum value $V_{max}$ to a value (inclusive) obtained by dividing the reference value $V_H$ by the maximum value $V_{min}$.

For example, in FIG. 3B, the time setting unit 250 calculates, based on the largest maximum value $V_{max}$, a lower limit accumulation time ratio $T_L=V_L/V_{max}$ whose lower limit value is set to the reference value $V_L$. Similarly, the time setting unit 250 calculates, based on the smallest maximum value $V_{min}$, an upper limit accumulation time ratio $T_H=V_H/V_{min}$ whose upper limit value is set to the reference value $V_H$. The time setting unit 250 then sets the accumulation time of the photoelectric conversion devices forming the detection unit 30 to fall within the range from the lower limit accumulation time ratio $T_L$ (inclusive) to the upper limit accumulation time ratio $T_H$ (inclusive). For example, the accumulation time of the photoelectric conversion devices forming the detection unit 30 may be set to the average value of the lower limit accumulation time ratio $T_L$ and the upper limit accumulation time ratio $T_H$. If the accumulation time of the photoelectric conversion devices is made longer, a detected light intensity increases. On the other hand, if the accumulation time of the photoelectric conversion devices is made shorter, a detected light intensity decreases.

By setting the accumulation time of the photoelectric conversion devices as described above, the largest maximum value $V_{max}$ included in the light intensity signals becomes equal to or larger than the reference value $V_L$ as a lower limit value, and the smallest maximum value $V_{min}$ included in the light intensity signals becomes equal to or smaller than the reference value $V_H$ as an upper limit value. As shown in FIG. 3A, therefore, peak values Pk1 to Pk5 included in the light intensity signals are correctly converted into binary values with reference to the threshold, and binary signals "1, 1, 0, 0, 1" are output from a comparison unit 120.

The absolute encoder 1C can stabilize the light intensity signals which are output from the detection unit 30 and processed by the processing unit 100C, irrespective of a change in environment, a change with time, attachment of a scale 20 or a light source 10 and the detection unit 30, manufacturing variations in scales 20, and the like. The absolute encoder 1C can thus measure the absolute position of the scale 20 with high accuracy.

Fourth Embodiment

Figure 7:
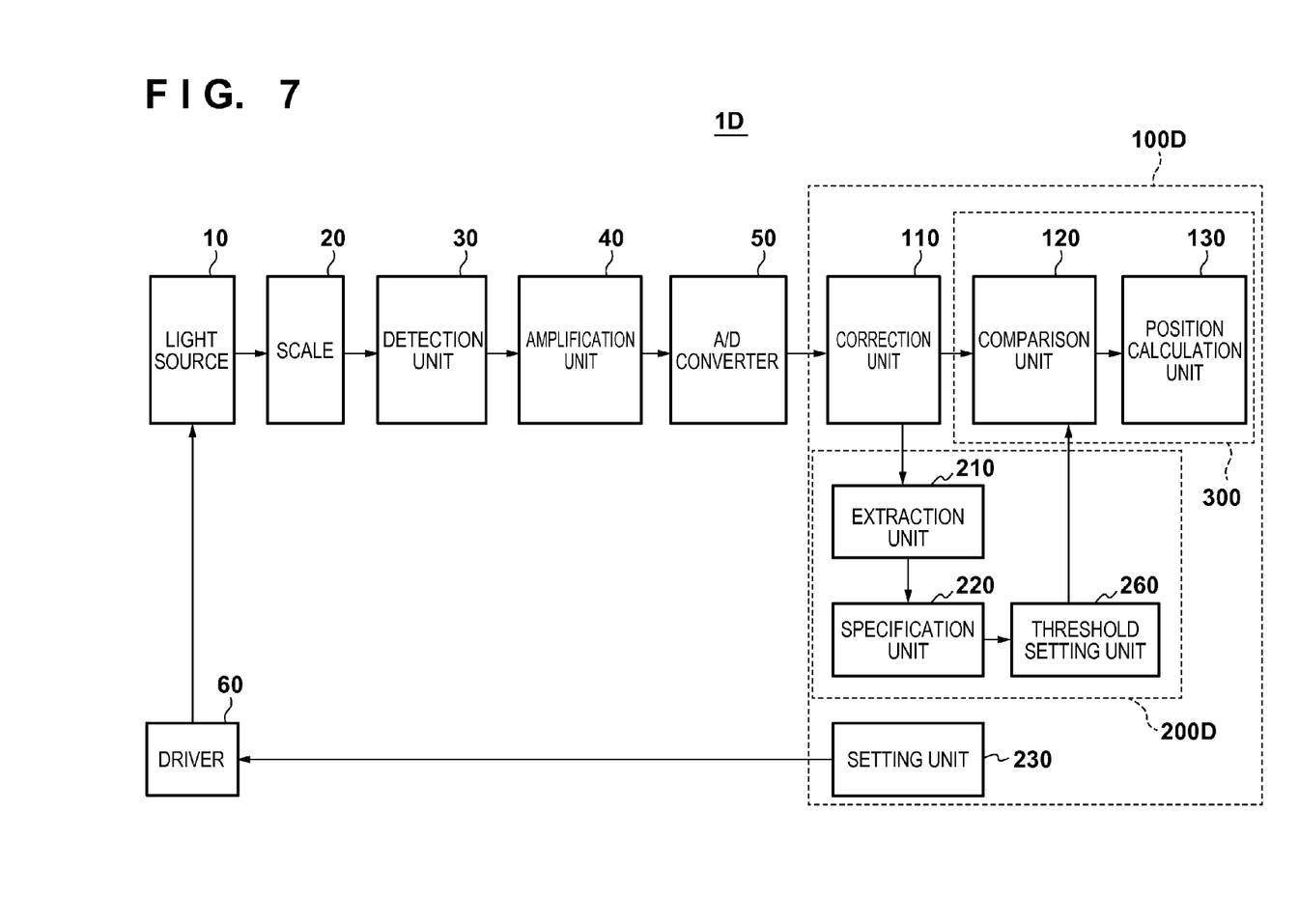
FIG. 7 is a schematic block diagram showing the arrangement of an absolute encoder according to the fourth embodiment of the present invention.

FIG. 7 is a schematic block diagram showing the arrangement of an absolute encoder 1D according to the fourth embodiment of the present invention. A processing unit 100D, more specifically, a calibration unit 200D of the absolute encoder 1D is different from that of the absolute encoder 1A. In this embodiment, the calibration unit 200D includes an extraction unit 210, a specification unit 220, and a threshold setting unit 260.

Calibration by the calibration unit 200D will be described in detail with reference to FIGS. 3A and 7. As in the first embodiment, the extraction unit 210 extracts a maximum value for each period of light intensity signals. The specification unit 220 specifies a largest maximum value $V_{max}$ and a smallest maximum value $V_{min}$ from the maximum values extracted by the extraction unit 210.

The threshold setting unit 260 sets a threshold in a comparison unit 120 to fall within the range from the smallest maximum value $V_{min}$ (exclusive) to the largest maximum value $V_{max}$ (exclusive). The threshold in the comparison unit 120 may be set to, for example, the average value of the largest maximum value $V_{max}$ and the smallest maximum value $V_{min}$.

By setting the threshold in the comparison unit 120 as described above, the largest maximum value $V_{max}$ included in the light intensity signals becomes equal to or larger than the threshold and the smallest maximum value $V_{min}$ included in the light intensity signals becomes equal to or smaller than the threshold. As shown in FIG. 3A, therefore, peak values Pk1 to Pk5 included in the light intensity signals are correctly converted into binary values with reference to the threshold, and binary signals "1, 1, 0, 0, 1" are output from the comparison unit 120.

The absolute encoder 1D can stabilize the light intensity signals which are output from a detection unit 30 and processed by the processing unit 100D, irrespective of a change in environment, a change with time, attachment of a scale 20 or a light source 10 and the detection unit 30, manufacturing variations in scales 20, and the like. The absolute encoder 1D can thus measure the absolute position of the scale 20 with high accuracy.

Fifth Embodiment

Figure 8:
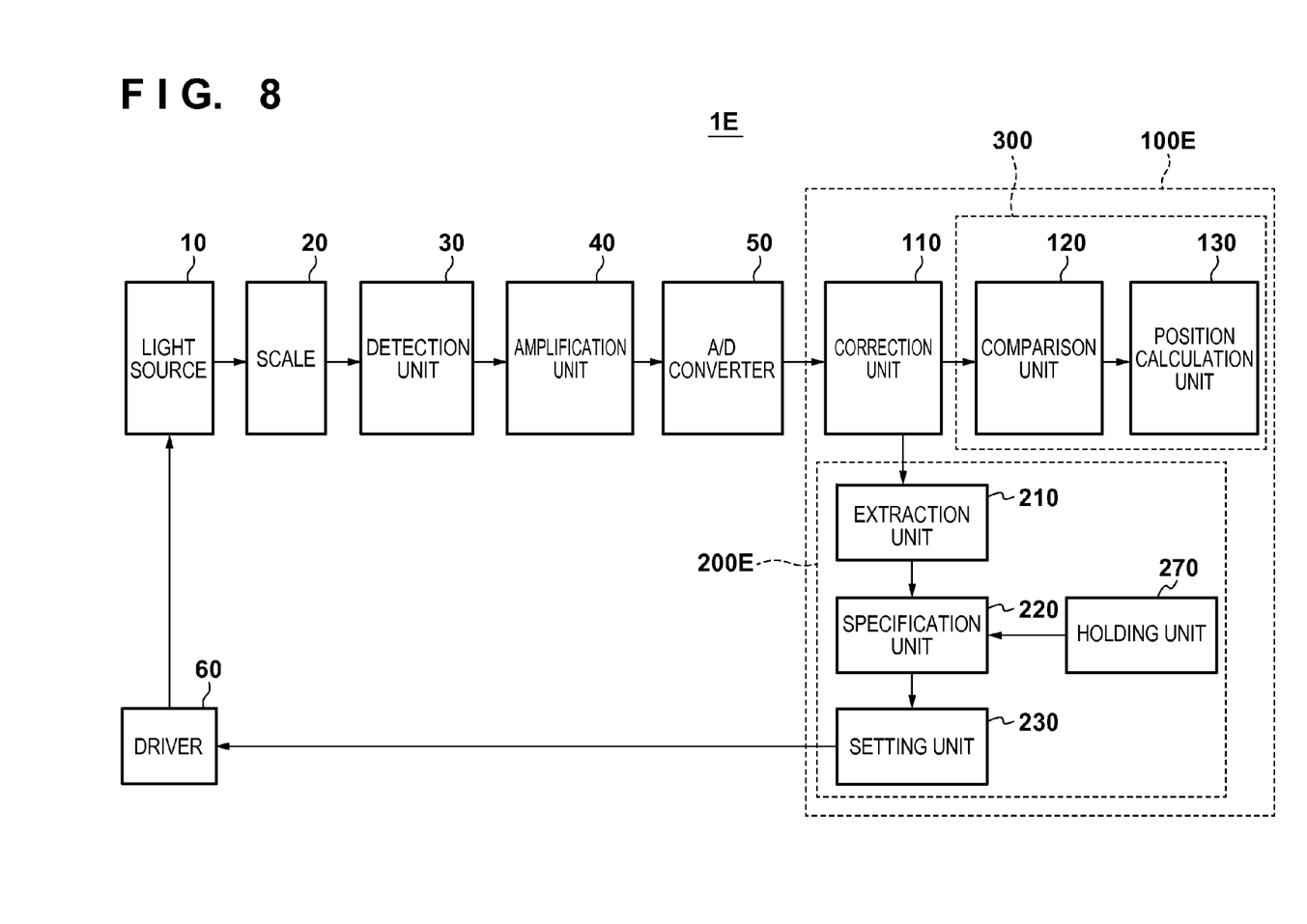
FIG. 8 is a schematic block diagram showing the arrangement of an absolute encoder according to the fifth embodiment of the present invention.

FIG. 8 is a schematic block diagram showing the arrangement of an absolute encoder 1E according to the fifth embodiment of the present invention. A processing unit 100E, more specifically, a calibration unit 200E of the absolute encoder 1E is different from that of the absolute encoder 1A. In this embodiment, the calibration unit 200E includes an extraction unit 210, a specification unit 220, a setting unit 230, and a holding unit 270.

Light intensity signals output from a detection unit 30 may vary depending on manufacturing variations in scales 20 in addition to a change in environment, a change with time, and attachment of a scale 20 or a light source 10 and the detection unit 30. If, for example, first marks 22 having a transmittance of 100%, second marks 24 having a transmittance of 50%, and third marks 26 having a transmittance of 0% are formed on the scale 20, transmittance variations from several % to several tens % may occur due to manufacturing variations. For example, $+\Delta P_1$ and $-\Delta P_2$ represent the maximum values of transmittance variations of the marks formed on the scale 20. The maximum values of the transmittance variations may be actually measured on the scale 20, or design values may be used as the maximum values. The maximum values $+\Delta P_1$ and $-\Delta P_2$ of the transmittance variations of the marks formed on the scale 20 are held in the holding unit 270.

Figure 9:
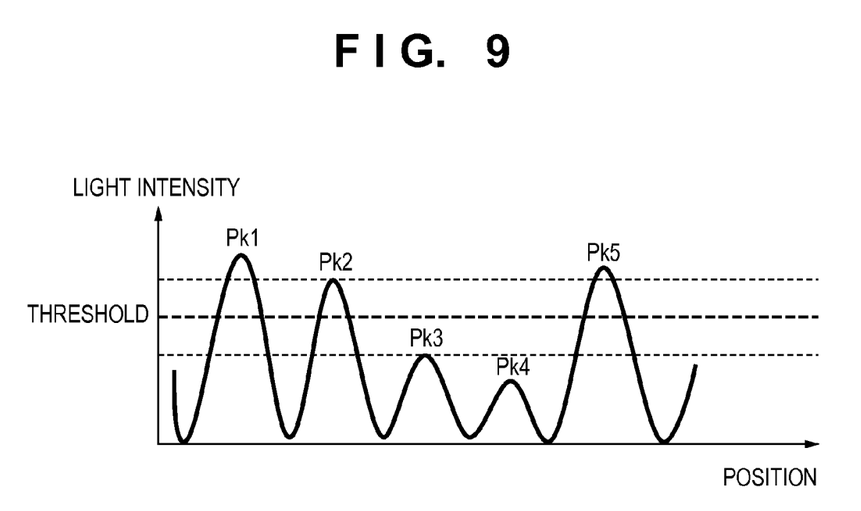
FIG. 9 is a graph showing an example of light intensity signals output from the detection unit of the absolute encoder shown in FIG. 8.

FIG. 9 is a graph showing an example of the light intensity signals output from the detection unit 30 when the transmittances (or reflectances) of the marks formed on the scale 20 vary. Referring to FIG. 9, peak values Pk1, Pk2, and Pk5 as first peak values corresponding to the first marks 22 vary without indicating the same light intensity. Peak values Pk3 and Pk4 as second peak values corresponding to the second marks 24 vary without indicating the same light intensity.

Figure 10:
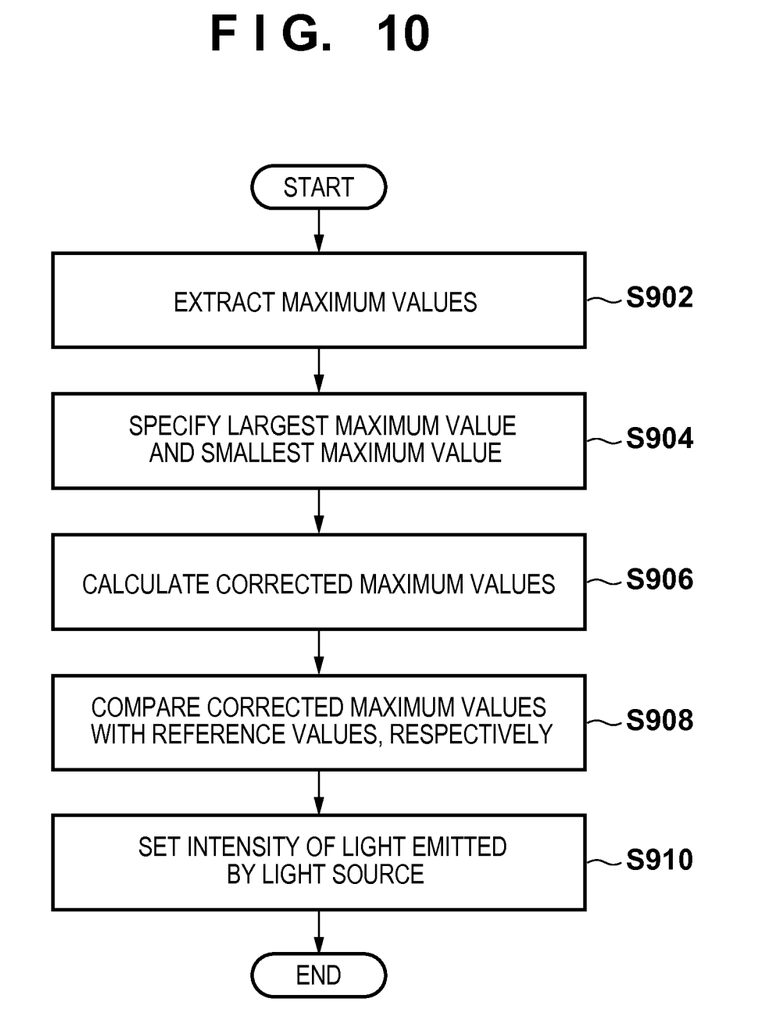
FIG. 10 is a flowchart for explaining calibration by the calibration unit of the absolute encoder shown in FIG. 8.

Calibration by the calibration unit 200E will be described in detail with reference to FIGS. 3A, 8, and 10. Processes in steps S902 and S904 are the same as those in steps S402 and S404 shown in FIG. 4, respectively, and a detailed description thereof will be omitted.

In step S906, the specification unit 220 calculates corrected maximum values $V_{max\_min}$ and $V_{min\_max}$ from a largest maximum value $V_{max}$ and a smallest maximum value $V_{min}$ based on the maximum values $+\Delta P_1$ and $-\Delta P_2$ of the transmittance variations held in the holding unit 270. For example, the specification unit 220 calculates the corrected maximum value $V_{max\_min}=V_{max}\times(1-\Delta P_2)$ with respect to the maximum value $V_{max}$. The corrected maximum value $V_{max\_min}$ is a maximum value at which the light intensity is lowest. Furthermore, the specification unit 220 calculates the corrected maximum value $V_{min\_max}=V_{min}\times(1+\Delta P_1)$ with respect to the maximum value $V_{min}$. The corrected maximum value $V_{min\_max}$ is a minimum value at which the light intensity is highest.

In step S908, the setting unit 230 compares the corrected maximum value $V_{max\_min}$ calculated in step S906 with a predetermined reference value $V_L$, and compares the corrected maximum value $V_{min\_max}$ calculated in step S906 with a predetermined reference value $V_H$.

In step S910, based on a comparison result in step S908, the setting unit 230 sets the intensity of light emitted by the light source 10 so that the corrected maximum value $V_{max\_min}$ becomes equal to or larger than the reference value $V_L$ and the corrected maximum value $V_{min\_max}$ becomes equal to or smaller than the reference value $V_H$.

By setting the driving current value of the light source 10 as described above, the largest maximum value $V_{max}$ included in the light intensity signals becomes equal to or larger than the reference value $V_L$ as a lower limit value, and the smallest maximum value $V_{min}$ included in the light intensity signals becomes equal to or smaller than the reference value $V_H$ as an upper limit value. As shown in FIG. 3A, therefore, the peak values Pk1 to Pk5 included in the light intensity signals are correctly converted into binary values with reference to the threshold, and binary signals "1, 1, 0, 0, 1" are output from a comparison unit 120.

The absolute encoder 1E can stabilize the light intensity signals which are output from the detection unit 30 and processed by the processing unit 100E, in consideration of the transmittance variations of the marks formed on the scale 20 (manufacturing variations in scales 20). The absolute encoder 1E can thus measure the absolute position of the scale 20 with high accuracy.

In this embodiment, in step S910, the intensity of light emitted by the light source 10 is set based on the comparison result in step S908. The present invention, however, is not limited to this. As in the second, third, and fourth embodiments, in step S910, a gain in an amplification unit 40, the accumulation time of photoelectric conversion devices, and a threshold in the comparison unit 120 may be set based on the comparison result in step S908.

Sixth Embodiments

Figure 11:
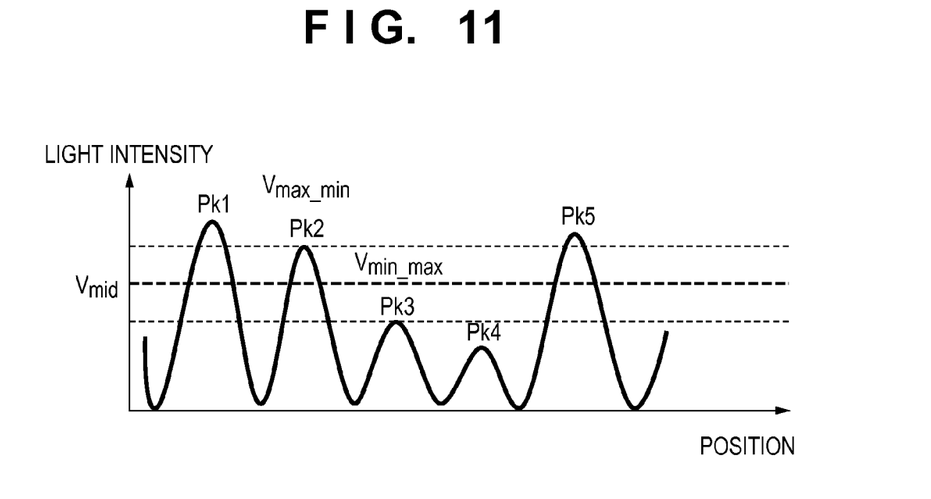
FIG. 11 is a graph showing an example of light intensity signals output from the detection unit of the absolute encoder shown in FIG. 8.

The arrangement of an absolute encoder according to the sixth embodiment of the present invention is the same as that of the absolute encoder 1E according to the fifth embodiment. FIG. 11 is a graph showing an example of light intensity signals output from a detection unit 30 when the transmittances (or reflectances) of marks formed on a scale 20 vary. Referring to FIG. 11, peak values Pk1, Pk2, and Pk5 as first peak values corresponding to first marks 22 vary without indicating the same light intensity. Peak values Pk3 and Pk4 as second peak values corresponding to second marks 24 vary without indicating the same light intensity.

Calibration by a calibration unit 200E will be described in detail with reference to FIG. 11. As in the fifth embodiment, an extraction unit 210 extracts a maximum value for each period of the light intensity signals. A specification unit 220 specifies a largest maximum value $V_{max}$ and a smallest maximum value $V_{min}$ among the maximum values extracted by the extraction unit 210 (a first specification unit).

The specification unit 220 calculates an intermediate value (first value) $V_{mid}$ between the largest maximum value $V_{max}$ and the smallest maximum value $V_{min}$. The specification unit 220 then specifies, among the maximum values extracted by the extraction unit 210, a maximum value (third maximum value) $V_{max\_min}$ which falls within the range from the intermediate value $V_{mid}$ (exclusive) to the maximum value $V_{max}$ (exclusive) and is closest to the intermediate value $V_{mid}$ (a second specification unit). Similarly, the specification unit 220 specifies, among the maximum values extracted by the extraction unit 210, a maximum value (fourth maximum value) $V_{min\_max}$ which falls within the range from the maximum value $V_{min}$ (exclusive) to the intermediate value $V_{mid}$ (exclusive) and is closest to the intermediate value $V_{mid}$ (the second specification unit). Note that the intermediate value $V_{mid}$ need only be, for example, the average value (($V_{max}$+ $V_{min}$)/2) of the largest maximum value $V_{max}$ and the smallest maximum value $V_{min}$.

For example, in FIG. 11, among the peak values Pk1 to Pk5, the specification unit 220 specifies the peak value Pk1 as the largest maximum value $V_{max}$ and the peak value Pk4 as the smallest maximum value $V_{min}$, thereby calculating the intermediate value $V_{mid}$ between them. The specification unit 220 then specifies, among the peak values Pk1 to Pk5, the peak value Pk2 as the maximum value $V_{max\_max}$ which falls within the range from the intermediate value $V_{mid}$ (exclusive) to the maximum value $V_{max}$ (exclusive) and is closest to the intermediate value $V_{mid}$. Similarly, the specification unit 220 specifies, among the peak values Pk1 to Pk5, the peak value Pk3 as the maximum value $V_{min\_max}$ which falls within the range from the maximum value $V_{min}$ (exclusive) to the intermediate value $V_{mid}$ (exclusive) and is closest to the intermediate value $V_{mid}$. As described above, in the embodiment, it is possible to specify the largest maximum value and smallest maximum value which are close to the threshold even if the peak values Pk1, Pk2, and Pk5 do not indicate the same light intensity and the peak values Pk3 and Pk4 do not indicate the same light intensity.

A setting unit 230 compares the maximum value $V_{max\_min}$ specified by the specification unit 220 with a predetermined reference value $V_L$, and compares the maximum value $V_{min\_max}$ specified by the specification unit 220 with a predetermined reference value $V_H$. Based on a comparison result, the setting unit 230 then sets the intensity of light emitted by a light source 10 so that the maximum value $V_{max\_min}$ becomes equal to or larger than the reference value $V_L$ and the maximum value $V_{min\_max}$ becomes equal to or smaller than the reference value $V_H$.

By setting the driving current value of the light source 10 as described above, the largest maximum value $V_{max}$ included in the light intensity signals becomes equal to or larger than the reference value $V_L$ as a lower limit value, and the smallest maximum value $V_{min}$ included in the light intensity signals becomes equal to or smaller than the reference value $V_H$ as an upper limit value. As shown in FIG. 3A, therefore, the peak values Pk1 to Pk5 included in the light intensity signals are correctly converted into binary values with reference to the threshold, and binary signals "1, 1, 0, 0, 1" are output from a comparison unit 120.

The absolute encoder 1E can stabilize the light intensity signals which are output from the detection unit 30 and processed by the processing unit 100E, in consideration of transmittance variations of the marks formed on the scale 20 (manufacturing variations in scales 20). The absolute encoder 1E can thus measure the absolute position of the scale 20 with high accuracy.

Although the intensity of light emitted by the light source 10 is set in this embodiment, the present invention is not limited to this. As in the second, third, and fourth embodiments, a gain in an amplification unit 40, the accumulation time of photoelectric conversion devices, and a threshold in the comparison unit 120 may be set.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-274051 filed on Dec. 14, 2012, which is hereby incorporated by reference herein in its entirety.

What is claimed is:

1. An absolute encoder comprising:
a scale on which a first mark and a second mark are arrayed;
a light source configured to emit light with which the scale is irradiated;
a detector configured to detect light from the scale, and to output periodic signals in which peak values, including a first peak value corresponding to the first mark and a second peak value corresponding to the second mark and smaller than the first peak value, periodically appear; and
a processor configured to obtain a code sequence by binarization of the first peak value and the second peak value in the periodic signals output from the detector,
wherein the processor has a function of performing calibration so that the first peak value becomes larger than a threshold for the binarization and the second peak value becomes smaller than the threshold,
the processor being further configured to
specify a largest first maximum value and a smallest second maximum value among maximum values of the periodic signals with regard to respective periods thereof, and
set an intensity of the light emitted by the light source so that the first maximum value is not smaller than a first reference value larger than the threshold, and the second maximum value is not larger than a second reference value smaller than the threshold.

2. An absolute encoder comprising:
a scale on which a first mark and a second mark are arrayed;
a detector configured to detect light from the scale, and to output periodic signals in which peak values, including a first peak value corresponding to the first mark and a second peak value corresponding to the second mark and smaller than the first peak value, periodically appear;
an amplifier configured to amplify the periodic signals output from the detector; and
a processor configured to obtain a code sequence by binarization of the first peak value and the second peak value in the amplified periodic signals output from the amplifier,
wherein the processor has a function of performing calibration so that the first peak value becomes larger than a threshold for the binarization and the second peak value becomes smaller than the threshold,
the processor being further configured to
specify a largest first maximum value and a smallest second maximum value among maximum values of the periodic signals with regard to respective periods thereof, and
set a gain of the amplifier so that the gain is not smaller than a value obtained by dividing a first reference value larger than the threshold by the first maximum value, and is not larger than a value obtained by dividing a second reference value smaller than the threshold by the second maximum value.

3. An absolute encoder comprising:
a scale on which a first mark and a second mark are arrayed;
a detector configured to detect light from the scale, and to output periodic signals in which peak values, including a first peak value corresponding to the first mark and a second peak value corresponding to the second mark and smaller than the first peak value, periodically appear;

a processor configured to obtain a code sequence by binarization of the first peak value and the second peak value in the periodic signals output from the detector, wherein the detector includes a photoelectric conversion device configured to perform photoelectric conversion of the light from the scale to output the periodic signals, and wherein the processor has a function of performing calibration so that the first peak value becomes larger than a threshold for the binarization and the second peak value becomes smaller than the threshold, the processor being further configured to specify a largest first maximum value and a smallest second maximum value among maximum values of the periodic signals with regard to respective periods thereof, and set an accumulation time of the photoelectric conversion device based on a time ratio which is not smaller than a value obtained by dividing a first reference value larger than the threshold by the first maximum value, and is not larger than a value obtained by dividing a second reference value smaller than the threshold by the second maximum value.

4. An absolute encoder comprising:

a scale on which a first mark and a second mark are arrayed;

a detector configured to detect light from the scale, and to output periodic signals in which peak values, including a first peak value corresponding to the first mark and a second peak value corresponding to the second mark and smaller than the first peak value, periodically appear;

a processor configured to obtain a code sequence by binarization of the first peak value and the second peak value in the periodic signals output from the detector, wherein the processor has a function of performing calibration so that the first peak value becomes larger than a threshold for the binarization and the second peak value becomes smaller than the threshold, the processor being further configured to specify a largest first maximum value and a smallest second maximum value among maximum values of the periodic signals with regard to respective periods thereof, and perform the calibration so that a value obtained by correcting the first maximum value based on a maximum value of variations in intensity of light from the first mark is not smaller than a first reference value larger than the threshold, and a value obtained by correcting the second maximum value based on a maximum value of variations in intensity of light from the second mark is not larger than a second reference value smaller than the threshold.

5. An absolute encoder comprising:

a scale on which a first mark and a second mark are arrayed;

a detector configured to detect light from the scale, and to output periodic signals in which peak values, including a first peak value corresponding to the first mark and a second peak value corresponding to the second mark and smaller than the first peak value, periodically appear; and a processor configured to obtain a code sequence by binarization of the first peak value and the second peak value in the periodic signals output from the detector, wherein the processor has a function of performing calibration so that the first peak value becomes larger than a threshold for the binarization and the second peak value becomes smaller than the threshold, the processor being further configured to specify, among maximum values of the periodic signals with regard to respective periods thereof, a largest first maximum value, a smallest second maximum value, a third maximum value which is smaller than the first maximum value, larger than a first value between the first maximum value and the second maximum value, and closest to the first value, and a fourth maximum value which is larger than the second maximum value, smaller than the first value and closest to the first value, and perform the calibration so that a value obtained by correcting the third maximum value is not smaller than a first reference value larger than the threshold, and a value obtained by correcting the fourth maximum value is not larger than a second reference value smaller than the threshold.

6. The encoder according to claim 5, wherein the first value is an average value of the first maximum value and the second maximum value.

7. The encoder according to claim 1, wherein on the scale, third marks, different from the first mark and the second mark, are arranged with spaces therebetween, and one of the first mark and the second mark is arranged at each of the spaces.

8. The encoder according to claim 2, wherein on the scale, third marks, different from the first mark and the second mark, are arranged with spaces therebetween, and one of the first mark and the second mark is arranged at each of the spaces.

9. The encoder according to claim 3, wherein on the scale, third marks, different from the first mark and the second mark, are arranged with spaces therebetween, and one of the first mark and the second mark is arranged at each of the spaces.

10. The encoder according to claim 4, wherein on the scale, third marks, different from the first mark and the second mark, are arranged with spaces therebetween, and one of the first mark and the second mark is arranged at each of the spaces.

11. The encoder according to claim 5, wherein on the scale, third marks, different from the first mark and the second mark, are arranged with spaces therebetween, and one of the first mark and the second mark is arranged at each of the spaces.

12. An absolute encoder comprising:

a scale on which a first mark and a second mark are arrayed;

a detector configured to detect light from the scale, and to output periodic signals in which peak values, including a first peak value corresponding to the first mark and a second peak value corresponding to the second mark and smaller than the first peak value, periodically appear; and a processor configured to obtain a code sequence by binarization of the first peak value and the second peak value in the periodic signals output from the detector, wherein the processor has a function of performing calibration so that the first peak value becomes larger than a threshold for the binarization and the second peak value becomes smaller than the threshold, the processor being further configured to specify a largest first maximum value and a smallest second maximum value among maximum values of the periodic signals with regard to respective periods thereof, and perform the calibration so that the first maximum value is not smaller than a first reference value larger than the threshold, and the second maximum value is not larger than a second reference value smaller than the threshold.

* * * * *